Patented Sept. 27, 1949

2,482,986

UNITED STATES PATENT OFFICE 2,482,986

MODELING CLAY

Mayme R. McClatchey and Ethel M. Goodale,
Helena, Mont.

No Drawing. Application September 4, 1947,
Serial No. 772,210

3 Claims. (Cl. 106—214)

This invention relates to modeling clay and more particularly to modeling clay for permanently fashioning articles therefrom.

Among the object of this invention are the provision of a modeling clay which may be easily worked yet which hardens without firing; the provision of a modeling clay which may be made in desired colors; the provision of a modeling clay from which very thin surfaces can be fashioned; the provision of a modeling clay the different colors of which may be blended manually during the modeling operation; and, the provision of methods for conveniently preparing such modeling clay. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Modeling clays heretofore prepared have had numerous disadvantages. Many of them do not harden sufficiently except after firing to form a permanent article. Others are coarse, unattractive and uninteresting in color. With most modeling clays any thin surfaces which are part of the finished modeled article are very fragile so that in practice they are avoided. Many modeling clays require glazing. Others are sticky and stain fingers and clothes.

According to the present invention a modeling clay is provided which may be made in any desired color or shade, which hardens without firing and requires no glazing and which is not sticky nor will it stain fingers or clothing. The modeling clay of the present invention contains three components in addition to the coloring material. These are powdered cornstarch, flour salt and water. These must be mixed in the correct proportions and in the proper manner in order to obtain the advantages of the present invention.

Two parts by volume of powdered cornstarch are thoroughly mixed dry with three parts by volume of flour salt. A satisfactory way for accomplishing this dry mixing is by sifting the two components together through at least three operations. To the homogeneous mixture of cornstarch and flour salt are added three parts by volume of water containing any desired vegetable color. The color containing water is then mixed into the homogeneous cornstarch-flour salt mixture and the resulting composition is heated in the presence of steam until transparent. This step may be conveniently carried out by steaming the mixture over a double boiler while stirring constantly. The transparent mixture is then removed from the container and permitted to cool after which it is kneaded until smooth.

The order of mixing specified above is important in order to obtain the modeling clay of the present invention. Moreover, the heating operation should be discontinued when the mixture has become transparent or the product will be deleteriously affected.

The modeling clay of the present invention may be used to model desired articles, which may include flower petals, figurines, jewelry and numerous other objects. The resulting product hardens without firing to form a sturdy article which even if it includes thin surfaces will stand normal handling. The colors do not fade even after exposure for long periods of time. The modeled products have a bisque finish and if an edible color is employed, they are non-poisonous and may be given to children to play with without danger.

One important advantage of the modeling clay of the present invention is that when different colors are incorporated in different batches, the various batches may be blended together during the modeling operation to form intermediate shades or to blend one color into another. The modeling operation is carried out by pressing the clay between the fingers and the blending referred to may be accomplished at this stage by merely molding clay from two different batches which contain different colors, together.

The modeling clay of the present invention should be stored in closed containers when not in use. The drying time is dependent upon the thickness of the modeled article, but in general after twenty-four to thirty-six hours the product is firm enough to be handled. The hardened modeled articles are not fragile even though they contain very thin surfaces, but possess a remarkable sturdiness toward shock.

In addition to the various liquid vegetable colors, finely divided dry pigments may be employed as the color component. Where such a dry pigment is used, an equivalent volume of cornstarch should be omitted. The dry pigment can be incorporated either with the water or with the flour salt. To make white modeling clay the color is merely omitted.

Whether liquid vegetable colors or dry pigments are employed the modeling clay of the present invention need be made merely in the primary colors. The modeling artist can then reduce the color with white modeling clay to make pastel shades or can mix two or more colors together to form a third. Two or more colors, whether they are primary colors or mixtures prepared by the artist can be blended into one another.

Molded products of any type may be prepared from the modeling clay of the present invention. These include artificial flowers, figurines, jewelry, paper weights, etc.

Substantially varying the components, the proportions or the method of preparing the clay will result in a product which does not have the advantages of the modeling clay of the present invention.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. Modeling clay consisting essentially of approximately two parts of cornstarch, three parts of flour salt and three parts of water, all by volume.

2. Modeling clay consisting essentially of approximately two parts of cornstarch, three parts of flour salt, three parts of water, all by volume, and a color component.

3. Modeling clay consisting essentially of approximately two parts of cornstarch, three parts of flour salt, three parts of water, all by volume, and an edible coloring component.

MAYME R. McCLATCHEY.
ETHEL M. GOODALE.

REFERENCES CITED

The following references are of record in the file of this patent:

UNITED STATES PATENTS

| Number | Name | Date |
|---|---|---|
| 2,241,376 | Carter | Dec. 5, 1939 |

OTHER REFERENCES

Kerr: "Chemistry and Industry of Starch," 1944, page 103.